United States Patent
Lee et al.

(10) Patent No.: US 9,893,393 B2
(45) Date of Patent: Feb. 13, 2018

(54) METHOD FOR REMOVING GAS GENERATED IN LITHIUM SECONDARY BATTERY

(71) Applicant: LG Chem, Ltd., Seoul (KR)

(72) Inventors: Su-Rim Lee, Daejeon (KR); Song-Taek Oh, Daejeon (KR); Jung-Seok Choi, Daejeon (KR); Hyeok-Moo Lee, Daejeon (KR); Ji-Hye Park, Daejeon (KR)

(73) Assignee: LG Chem, Ltd. (KR)

( * ) Notice: Subject to any disclaimer, the term of this patent is extended or adjusted under 35 U.S.C. 154(b) by 572 days.

(21) Appl. No.: 14/516,831

(22) Filed: Oct. 17, 2014

(65) Prior Publication Data
US 2015/0118524 A1    Apr. 30, 2015

(30) Foreign Application Priority Data
Oct. 31, 2013   (KR) .................. 10-2013-0131046

(51) Int. Cl.
*H01M 10/52*   (2006.01)
*H01M 10/44*   (2006.01)
*H01M 10/052*  (2010.01)

(52) U.S. Cl.
CPC ......... *H01M 10/52* (2013.01); *H01M 10/052* (2013.01); *H01M 10/44* (2013.01); *Y02T 10/7011* (2013.01)

(58) Field of Classification Search
CPC .. H01M 10/52; H01M 10/058; H01M 10/052; H01M 10/049; H01M 10/446; H01M 4/505; H01M 4/525
See application file for complete search history.

(56) References Cited

U.S. PATENT DOCUMENTS 8,021,773 B1 *   9/2011   Simon ............... H01M 10/4207
                                                    429/149
2003/0008213 A1    1/2003   Cho
(Continued)

FOREIGN PATENT DOCUMENTS

JP    2002216851 A    8/2002
KR    2006-0087333 A  8/2006
(Continued)

OTHER PUBLICATIONS

Machine Translation of: KR 1020110115844 A1, Oh et al., Oct. 24, 2011.*

*Primary Examiner* — Kenneth J Douyette
(74) *Attorney, Agent, or Firm* — Lerner, David, Littenberg, Krumholz & Mentlik, LLP

(57) ABSTRACT

The present disclosure provides a method for removing gases generated in a lithium secondary battery using a cathode active material of the following formula (I)

$$Li(Li_xM_{y-y'}M'_{y'})O_{2-z}A_z \qquad (I)$$

wherein, x, y, y', and z satisfy $0<x<0.5$, $0.6<y'<1.1$, $0\leq y'<0.2$, and $0\leq z<0.2$, M is any one selected from the group consisting of Mn, Ni, Co, Fe, Cr, V, Cu, Zn, and Ti, M' is any one selected from the group consisting of Al, Mg and B; and A is any one selected from the group consisting of F, S and N by carrying out two or more degassing steps under the conditions of above and below a voltage that the structural variation of the cathode active material occurs, thereby inducing a uniform initial reaction in a cathode and an anode to enhance the life time of the battery.

5 Claims, 1 Drawing Sheet

(56) References Cited

U.S. PATENT DOCUMENTS

| | | | | |
|---|---|---|---|---|
| 2005/0233207 | A1* | 10/2005 | Kim | H01M 10/0567 |
| | | | | 429/122 |
| 2008/0311475 | A1* | 12/2008 | Manev | H01M 4/485 |
| | | | | 429/231.5 |
| 2010/0024204 | A1 | 2/2010 | Min et al. | |
| 2012/0058379 | A1* | 3/2012 | Kishi | H01M 4/485 |
| | | | | 429/149 |
| 2013/0260249 | A1* | 10/2013 | Choi | H01M 4/0404 |
| | | | | 429/223 |
| 2014/0000100 | A1 | 1/2014 | Oh et al. | |

FOREIGN PATENT DOCUMENTS

| | | | | |
|---|---|---|---|---|
| KR | 102011011584 | A1 * | 10/2011 | H01M 10/04 |
| KR | 20130033060 | A | 4/2013 | |

\* cited by examiner

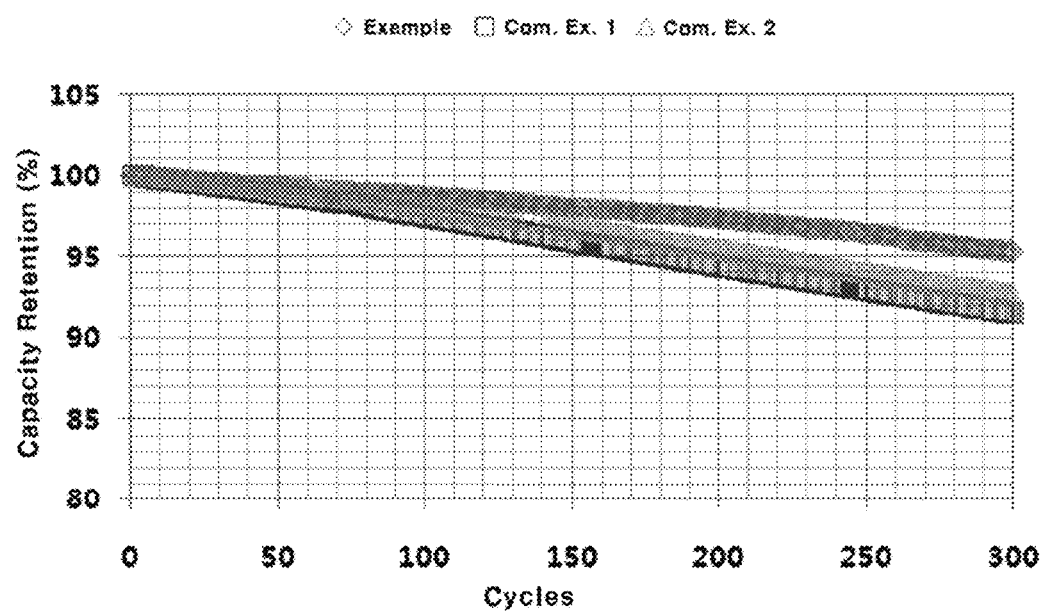

METHOD FOR REMOVING GAS GENERATED IN LITHIUM SECONDARY BATTERY

CROSS-REFERENCE TO RELATED APPLICATION

This application claims priority to Korean Patent Application No. 10-2013-0131046 filed in the Republic of Korea on Oct. 31, 2013, which is incorporated herein by reference.

TECHNICAL FIELD

The present disclosure relates to a method for removing gases generated in a lithium secondary battery, more specifically to a method for removing gases that may be generated in a lithium secondary battery during the preparation process in advance prior to product shipping, the lithium secondary battery having a cathode with a cathode active material represented by formula (I) which will be described below.

BACKGROUND ART

Recently, there has been an increasing interest in energy storage technology. As the application fields of energy storage technologies have been extended to cellular phones, camcorders, notebook computers, PCs and electric cars, the demand for high energy density of batteries as a power source has been increasing. Lithium secondary batteries have been proposed as a battery that can satisfy such a demand, and their researches are being actively made.

However, the lithium secondary batteries may cause safety problems such as ignition and explosion and are difficult to be produced, because an organic electrolytic solution is used therein. Particularly, the lithium secondary batteries have recently been used under various conditions and environments as their application range is greatly expanded. As a result, a demand for lithium secondary batteries with a higher capacity is gradually increasing. In order to provide lithium secondary batteries with a higher capacity, the operation ranges of an electrode tend to be expanded, for example, into a high voltage. Such a high voltage is favorable in terms of battery capacity, but may cause more serious safety problems.

Generally, a lithium secondary battery is prepared by carrying out an activation process that initially charges a battery in the state of discharging. During such an activation process, a gas may be generated in the battery due to the formation of a passive film on an anode surface and the decomposition of moisture present in the battery. The generated gas may be remained within the battery to result in Li plating, which adversely affect the life time of the battery. Therefore, it is necessary to conduct a degassing procedure during or after the activation process.

In particular, a lithium-containing compound with a layered structure, represented by the following formula (I), has a specific uniform potential in the region of 4.3 to 4.8 V, unlike other cathode materials that have been conventionally known, and should go through an activation process at high voltage conditions above such uniform potential region so as for the compound to exhibit a high capacity through the structural variation thereof. In the activation process, the lithium-containing compound used as a cathode active material is subject to structural variation at a high voltage, from which large amounts of gases may be generated and remained within the battery to deteriorate the transfer of lithium ions and result in Li plating locally. Therefore, gases generated during the activation process should be removed.

However, there has been no technology being effective to remove gases generated during a high voltage activation process for a lithium secondary battery that has a cathode comprising a cathode active material represented by the following formula (I):

  (I)

wherein, x, y, y', and z satisfy 0<x<0.5, 0.6<y<1.1, 0≤y'<0.2, and 0≤z<0.2,

M is any one selected from the group consisting of Mn, Ni, Co, Fe, Cr, V, Cu, Zn, and Ti, M' is any one selected from the group consisting of Al, Mg and B; and A is any one selected from the group consisting of F, S and N.

DISCLOSURE

Technical Problem

The present disclosure is designed to solve the above-mentioned problems, and therefore it is an object of the present disclosure to provide a method for removing gases generated in a lithium secondary battery using a cathode active material of the above formula (I) by carrying out two or more degassing steps under the conditions of above and below a voltage that the structural variation of the cathode active material occurs, thereby inducing a uniform initial reaction in a cathode and an anode to enhance the life time of the battery.

Technical Solution

In order to achieve the above object, in accordance with one aspect of the present disclosure, there is provided a method for removing gases generated in a lithium secondary battery that has a cathode comprising a cathode active material of formula (I), an anode, and a separator interposed between the cathode and the anode, comprising: (S1) removing gases generated in the lithium secondary battery while the lithium secondary battery is activated under voltage conditions being below a voltage region that the structural variation of the cathode active material occurs; and (S2) removing gases generated in the lithium secondary battery more than once during and after charging, and during and after discharging while the lithium secondary battery is charged and discharged under voltage conditions being above a voltage region that the structural variation of the cathode active material occurs:

  (I)

wherein, x, y, y', and z satisfy 0<x<0.5, 0.6<y<1.1, 0≤y'<0.2, and 0≤z<0.2,

M is any one selected from the group consisting of Mn, Ni, Co, Fe, Cr, V, Cu, Zn, and Ti, M' is any one selected from the group consisting of Al, Mg and B; and A is any one selected from the group consisting of F, S and N.

In the present disclosure, the voltage region that the structural variation of the cathode active material occurs may range from 4.3 to 4.8 V that exhibits a uniform potential.

Also, the steps of (S1) and (S2) may be carried out under vacuum.

Meanwhile, the anode may have an anode active material comprising metallic lithium, a carbon-based material, a metal compound or a mixture thereof.

The metal compound may be a compound containing any one selected from Si, Ge, Sn, Pb, P, Sb, Bi, Al, Ga, In, Ti, Mn, Fe, Co, Ni, Cu, Zn, Ag, Mg, Sr, Ba, and a mixture thereof.

Also, the separator may be a porous substrate made of any one selected from the group consisting of high-density polyethylene, a linear low-density polyethylene, a low-density polyethylene, an ultra-high molecular weight polyethylene, polypropylene, polybutylene, polypentene, polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate, and a mixture thereof.

Advantageous Effects

According to the present disclosure, for a lithium secondary battery using a cathode active material of the above formula (I), two or more degassing steps are carried out under the conditions of above and below a voltage that the structural variation of the cathode active material occurs, thereby removing gases present in the battery primarily below a voltage that the structural variation of the cathode active material occurs, the gases being generated (by virtue of the formation of a passive film and the decomposition of moisture present in the battery) before gas-generation by the structural variation of the cathode active material, so as to induce a uniform reaction later, and then removing gases generated in the battery above a voltage that the structural variation of the cathode active material occurs, so as to induce the complete structural variation of the cathode active material and remove gases present in the lithium secondary battery in advance prior to product shipping, thereby enhancing the life time of the battery.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

FIG. 1 is a graph showing capacity retention (%) of polymer pouch-type batteries prepared in the Example and the Comparative Examples of the present disclosure.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments proposed herein are just a preferable example for the purpose of illustrations only, not intended to limit the scope of the disclosure, so it should be understood that other equivalents and modifications could be made thereto without departing from the spirit and scope of the disclosure.

The present disclosure provides a method for removing gases generated in a lithium secondary battery that has a cathode comprising a cathode active material of formula (I), an anode, and a separator interposed between the cathode and the anode, comprising: (S1) removing gases generated in the lithium secondary battery while the lithium secondary battery is activated under voltage conditions being below a voltage region that the structural variation of the cathode active material occurs; and (S2) removing gases generated in the lithium secondary battery more than once during and after charging, and during and after discharging while the lithium secondary battery is charged and discharged under voltage conditions being above a voltage region that the structural variation of the cathode active material occurs:

$$Li(Li_xM_{y-y'}M'_{y'})O_{2-z}A_z \qquad (I)$$

wherein, x, y, y', and z satisfy $0<x<0.5$, $0.6<y<1.1$, $0\leq y'<0.2$, and $0\leq z<0.2$, M is any one selected from the group consisting of Mn, Ni, Co, Fe, Cr, V, Cu, Zn, and Ti, M' is any one selected from the group consisting of Al, Mg and B; and A is any one selected from the group consisting of F, S and N.

According to the present disclosure, in a the lithium secondary battery using a cathode active material of the above formula (I), two or more degassing steps are carried out under the conditions of above and below a voltage that the structural variation of the cathode active material occurs.

Firstly, in order to gases produced (by virtue of the formation of a passive film and the decomposition of moisture present in the battery) before gas-generation by the structural variation of the cathode active material, a degassing step for removing the gases is carried out below a voltage that the structural variation of the cathode active material occurs, which can induce the uniform structural variation of the cathode active material.

Then, an additional degassing step is carried out above a voltage that the structural variation of the cathode active material occurs, thereby inducing the complete structural variation of the cathode active material, and removing gases present in the lithium secondary battery in advance prior to product shipping, which can enhance the life time of the battery.

In the present disclosure, the voltage region that the structural variation of the cathode active material occurs may range from 4.3 to 4.8 V, preferably from 4.4 to 4.6 V that exhibits a uniform potential.

Also, the steps of (S1) and (S2) may be carried out under vacuum.

Meanwhile, the anode has the structure that an anode active material layer comprising an anode active material and a binder is applied on one or both surfaces of a current collector.

The anode active material may be a carbon-based material, lithium metal, a metal compound or a mixture thereof which can conventionally intercalate and disintercalate lithium ions.

Specifically, the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, mesocarbon microbeads, mesophase pitches, and high-temperature sintered carbon such as petroleum or coal tar pitch derived cokes.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba. Such a metal compound may be used in the form of a combination, an alloy, an oxide (e.g., $TiO_2$ and $SnO_2$), a nitride, a sulfide, a boride, an alloy with lithium and any other form. Among these, forms such as a combination, an alloy, an oxide and an alloy with lithium can provide high capacity to a battery. In particular, a compound containing at least one metal selected from Si, Ge and Sn, preferably Si and Sn can provide even higher capacity to a battery.

The cathode has the structure that a cathode active material layer comprising a cathode active material, a conductive material and a binder is applied on one or both surfaces of a current collector.

In the present disclosure, the conductive material is not particularly limited if it is an electrically conductive material which does not cause chemical change in an electrochemical device. As the conductive material, carbon black, graphite, carbon fiber, carbon nanotube, metal powders, and conductive metal oxides may be generally used, and examples of a commercially available conductive material include acetylene black series (Chevron Chemical Company or Gulf Oil Company), Ketjen Black EC series (Armak Company), Vulcan, XC-72 (Cabot Company) and Super P (MMM Carbon Company).

The binder used in the cathode and the anode functions to maintain cathode and anode active materials in a current collector and connect the active materials with each other, and may be any one which is conventionally used.

For example, various kinds of polymer binders including vinylidene fluoride-hexafluoropropylene copolymer (PVDF-co-HFP), polyvinylidene fluoride, polyacrylonitrile, polymethylmethacrylate, styrene butadiene rubber (SBR) and carboxymethyl cellulose (CMC) may be used.

The current collector used in the cathode and anode may be made of any high conductive metal as long as a slurry of the active material can easily adhere and has no reactivity within the voltage range of a battery. Specifically, non-limiting examples of a cathode current collector include aluminum foils, nickel foils and a combination thereof, and non-limiting examples of an anode current collector include copper foils, gold foils, nickel foils, copper alloy foils and a combination thereof. The current collector may be used in a laminated form of substrates made of such materials.

Each of the cathode and anode may be prepared by mixing an active material, a binder and a solvent having a high boiling point to form an electrode composite and applying the composite on the copper foil of a current collector, followed by drying, pressing and then heat-treatment at a temperature of 50 to 250° C. under vacuum for about 2 hours.

Also, the cathode active material layer has a thickness (per one side of a current collector) of 30 to 200 μm, preferably 50 to 150 μm, and the anode active material layer has a thickness of 1 to 200 μm, preferably 30 to 150 μm. When the cathode and the anode satisfies such a thickness range, a sufficient amount of an active material is provided in the layer of an electrode material to prevent a battery capacity from being lowered and improve cycle and rate characteristics.

Meanwhile, the separator which may be used in the present disclosure includes any one which has been conventionally used in the art, for example, porous membranes or non-woven fabrics made of a polyolefin-based polymer, but is not limited thereto.

The polyolefin-based porous membranes may be obtained from a polymer selected from polyethylenes such as a high-density polyethylene, a linear low-density polyethylene, a low-density polyethylene and an ultra-high molecular weight polyethylene, polypropylene, polybutylene, polypentene, and a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of a long fiber in structure.

The porous substrate has preferably a thickness of 5 to 50 μm, but is not particularly limited thereto. Also, the porous substrate has a pore size of 0.01 to 50 μm and a porosity of 10 to 95%, but is not particularly limited thereto.

Meanwhile, an electrolyte solution used in the present disclosure comprises an organic solvent and an electrolyte salt being a lithium salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent used in the electrolyte solution may be any one which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof is representatively used.

The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, propyl propionate, γ-butyrolactone, γ-valerolactone, γ-caprolactone, α-valerolactone, ε-caprolactone and a mixture thereof, but is not limited thereto.

The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

1. EXAMPLE (1) Preparation of Cathode

To N-methylpyrrolidone used as a solvent, Li(Li0.2Mn0.55Ni0.15Co0.1)O2 as a cathode active material, Denka black as a conductive material, and PVDF as a binder were added in a ratio of 90:5:5 to obtain a slurry, and the slurry was coated on an Al-foil having a thickness of 20 μm as a cathode current collector, followed by rolling and drying, to prepare a cathode.

(2) Preparation of Anode

To deionized water used as a solvent, 96 wt % of natural graphite as an anode active material, 3 wt % of PVDF as a binder, and 1 wt % of Denka black as a conductive material were added to obtain a slurry, and the slurry was coated on a Cu-foil having a thickness of 10 μm as an anode current collector, followed by rolling and drying, to prepare an anode.

(3) Preparation of Polymer Pouch-type Battery

The cathode, the anode, and a separator consisting of three layers being poly propylene/polyethylene/polypropylene (PP/PE/PP) were used in a stacked and folded form, to obtain a polymer pouch-type battery having a 25 mAh capacity at 1 C discharge rate. In the battery, a non-aqueous electrolytic solution (ethylene carbonate (EC):propylene carbonate (PC):diethyl carbonate (DEC)=30:20:50 (wt %), 1M lithium hexafluorophosphate) was introduced.

(4) Activation of Polymer Pouch-type Battery

The battery prepared above was charged with a current density of 0.1 C up to 4 V under CC/CV conditions (cut-off current 0.05 C). Then, a portion of the polymer pouch case was cut, followed by degassing for 2 seconds under vacuum (−95 kPa), and the cutting portion was again sealed with heat and pressure (Step 1).

Subsequently, the battery was charged up to 4.5 V under CC/CV conditions (cut-off current 0.05 C), and discharged up to 2.5 V under CC conditions. Then, a portion of the polymer pouch case was cut, followed by degassing for 2 seconds under vacuum (−95 kPa), and the cutting portion was again sealed with heat and pressure. After completing the activation process, the battery was operated at a voltage of between 4.35 and 2.5 V (Step 2).

2. COMPARATIVE EXAMPLE 1

The procedures of the Example were repeated except that the degassing of Step 1 was not carried out in the preparation and activation of a battery.

3. COMPARATIVE EXAMPLE 2

The procedures of the Example were repeated except that the degassing of Step 2 was not carried out in the preparation and activation of a battery.

4. MEASUREMENT OF GAS IN BATTERY

After activation in the Example and the Comparative Examples, each battery was put in a vacuum chamber, to which a pressure of −760 mmHg was applied. After the pressure of the chamber reached −760 mmHg, each battery was punctured in its exterior, and the punctured part was connected with a tube to collect gases emitted from the chamber for 10 minutes.

The amount of the collected gases was measured through a GC-Mass analysis. As a result, each amount of the residual gases in the battery relative to the total volume of the battery [Residual Gases (%)=Volume of eluted gas/Volume of battery before elution ×100] was confirmed into 2.2 vol % (the Example), 3.1 vol % (Comparative Example 1), and 13.2 vol % (Comparative Example 2). Among these, comparing the results of the Example and Comparative Example 2, the battery of the Example was gone through the degassing steps around a uniform potential voltage that the structural variation of the cathode active material occurs, thereby exhibiting a reduced amount of residual gases after activation process.

5. EVALUATION OF BATTERY CYCLE CHARACTERISTICS

After activation in the Example and the Comparative Examples, each polymer pouch-type battery was repeatedly charged and discharged at 45° C. under the conditions of 1 C charge (4.35 V CC/CV, cut-off 0.05 C) and 1 C discharge (2.5 V CC/CV, cut-off), and then measured for its capacity retention over cycles.

FIG. 1 is a graph showing capacity retention (%) of polymer pouch-type batteries prepared in the Example and the Comparative Examples.

From FIG. 1, the battery of Example was confirmed to exhibit superior life characteristics over those of Comparative Examples 1 and 2.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. A method for removing gases generated in a lithium secondary battery that has a cathode comprising a cathode active material of formula (I), an anode, and a separator interposed between the cathode and the anode, comprising:

(S1) removing gases generated in the lithium secondary battery while the lithium secondary battery is activated under voltage conditions being below a voltage region; and (S2) removing gases generated in the lithium secondary battery more than once during and after charging, and during and after discharging while the lithium secondary battery is charged and discharged under voltage conditions being above a voltage region:

$$Li(Li_xM_{y-y'}M'_{y'})O_{2-z}A_z \qquad (I)$$

wherein, x, y, y', and z satisfy 0<x<0.5, 0.6<y<1.1, 0≤y'<0.2, and 0≤z<0.2,

M is any one selected from the group consisting of Mn, Ni, Co, Fe, Cr, V, Cu, Zn, and Ti, M' is any one selected from the group consisting of Al, Mg and B; and A is any one selected from the group consisting of F, S and N, wherein the voltage region ranges from 4.3 to 4.8 V that exhibits a uniform potential, and (S1) is performed before (S2).

2. The method of claim 1, wherein, the steps of (S1) and (S2) are carried out under vacuum.

3. The method of claim 1, wherein the anode has an anode active material comprising metallic lithium, a carbon-based material, a metal compound or a mixture thereof.

4. The method of claim 3, wherein the metal compound is a compound containing any one selected from Si, Ge, Sn, Pb, P, Sb, Bi, Al, Ga, In, Ti, Mn, Fe, Co, Ni, Cu, Zn, Ag, Mg, Sr, Ba, and a mixture thereof.

5. The method of claim 1, wherein the separator is a porous substrate made of any one selected from the group consisting of high-density polyethylene, a linear low-density polyethylene, a low-density polyethylene and an ultra-high molecular weight polyethylene, polypropylene, polybutylene, polypentene, polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate, and a mixture thereof.

* * * * *